US007409532B2

(12) United States Patent
Berg et al.

(10) Patent No.: US 7,409,532 B2
(45) Date of Patent: Aug. 5, 2008

(54) METHOD AND APPARATUS FOR EXTENDING OPERATIONS OF AN APPLICATION IN A DATA PROCESSING SYSTEM

(75) Inventors: Daniel Christopher Berg, Cary, NC (US); Charles Dyer Bridgham, Cary, NC (US); Derek Francis Holt, Durham, NC (US); Ritchard Leonard Schacher, Cary, NC (US); Jason Ashley Sholl, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 11/089,987

(22) Filed: Mar. 24, 2005

(65) Prior Publication Data

US 2006/0218552 A1    Sep. 28, 2006

(51) Int. Cl.
*G06F 9/00* (2006.01)
(52) U.S. Cl. ....................................................... 712/200
(58) Field of Classification Search ................. 712/200; 717/168, 127, 128, 141, 154, 160
See application file for complete search history.

(56) References Cited

U.S. PATENT DOCUMENTS

| 5,675,803 | A | * | 10/1997 | Preisler et al. | 717/131 |
| 5,764,985 | A | | 6/1998 | Smale | 395/682 |
| 5,999,732 | A | * | 12/1999 | Bak et al. | 717/148 |
| 6,295,644 | B1 | * | 9/2001 | Hsu et al. | 717/158 |
| 6,633,923 | B1 | | 10/2003 | Kukura et al. | 709/316 |
| 6,745,385 | B1 | * | 6/2004 | Lupu et al. | 717/163 |
| 2003/0145310 | A1 | * | 7/2003 | Thames et al. | 717/123 |
| 2003/0233366 | A1 | * | 12/2003 | Kesselman et al. | 707/100 |
| 2004/0003119 | A1 | | 1/2004 | Munir et al. | 709/246 |
| 2004/0003371 | A1 | | 1/2004 | Coulthard et al. | 717/101 |
| 2004/0181771 | A1 | | 9/2004 | Anonsen et al. | 717/100 |
| 2004/0255234 | A1 | | 12/2004 | Methot | 715/500 |
| 2005/0015781 | A1 | * | 1/2005 | Brown et al. | 719/331 |

OTHER PUBLICATIONS

U.S. Appl. No. 11/065,825, Berg et al., Method and Apparatus for Implementing Dynamic Function Groups in a Data Processing System, filed Feb. 25, 2005.

* cited by examiner

*Primary Examiner*—Eric Coleman
(74) *Attorney, Agent, or Firm*—Duke W. Yee; Martin J. McKinley; Theodore D. Fay, III

(57) ABSTRACT

A method, an apparatus, and computer instructions are provided for extending operations of an application in a data processing system. A primary operation is executed. All extended operations of the primary operation are cached and pre and post operation identifiers are identified. For each pre operation identifier, a pre operation instance is created and executed. For each post operation identifier, a post operation instance is created and executed.

14 Claims, 11 Drawing Sheets

*401*        *402*        *404*
<operationExtension functionGroupID="FunctionGroup1"
*406* preOperationId="fg1.pre.op" *408*
*410* postOperationId="fg1.post.op" *412*
*414* extendableOperationID="primary.op"/> *416*

FIG. 6
600

FUNCTION GROUP DEFINITIONS
<extension id="fg1" *602*
   point="FunctionGroup">
</extension>
<extension id="fg2" *604*
   point="FunctionGroup">
</extension>
<extension id="fg3" *606*
   point="FunctionGroup">
</extension>

OPERATION EXTENSIONS *620*
<extension point="OperationExtension"> *622*
*624*<operationExtension
    functionGroupID="fg1" *640*
      preOperationId="FixGroup1OperationID" *642*
      extendableOperationID="RenameOperationID"/> *644*
*626*<operationExtension
    functionGroupID="fg3" *646*
      preOperationId="ReferenceHistoryOperationID" *648*
      extendableOperationID="FixGroupOperationID"/> *650*
*628*<operationExtension
    functionGroupID="fg2" *652*
      preOperationId="DeleteGroup2OperationID" *654*
      postOperationId="CreateGroup2ReferencesOperationID" *656*
      extendableOperationID="RenameOperationID"/> *658*
*630*<operationExtension
    functionGroupID="fg3" *660*
      preOperationId="ReferenceHistoryOperationID" *662*
      extendableOperationID="DelteGroup2OperationID"/> *664*
</extension>

METHOD AND APPARATUS FOR EXTENDING OPERATIONS OF AN APPLICATION IN A DATA PROCESSING SYSTEM

CROSS-REFERENCE TO RELATED APPLICATION

The present invention is related to the following applications entitled METHOD AND APPARATUS FOR IMPLEMENTING DYNAMIC FUNCTION GROUPS IN A DATA PROCESSING SYSTEM, U.S. Ser. No. 11/065,825 filed on Feb. 25, 2005.

BACKGROUND OF THE INVENTION

1. Technical Field

The present invention relates to an improved data processing system. In particular, the present invention relates to operations executed by an application. Still more particular, the present invention relates to extending operations of an application in a data processing system.

2. Description of Related Art

In most applications, an operation or unit of work may call other operations during its execution to perform additional functions. Example of operations include add, remove, and edit operations of resources. A group, such as a third party vendor, may find it difficult to contribute or extend a given operation to provide additional functionality, since the group does not own the operation that they would like to extend.

Currently, there are three main approaches used in contributing new operations. The first approach extends an operation by overriding a base operation in the runtime environment. However, this approach fails to allow a user control over the ordering in which extending operations run and it also limits the level of extension to only one level deep. In the case of overriding, this implies ambiguity when one or more extenders wish to add function that extends the same operation. Since only one extender can override, it is not possible to allow multiple extensions.

The second approach for contributing new operations involves business rule beans that allow a base operation to provide a trigger point, which may be used by an extender to contribute additional operations and extend base operations. The trigger point is defined within the code, with a specific identifier. Extenders then provide executable code that is associated with the identifier by placing the code within a specific directory location. While this approach provides extension points for extending operations, the base operation is responsible for defining its own trigger points, which means developers must anticipate in advance at what points third parties may wish to extend the operation. In many cases, however, it is impossible to know in advance all the ways in which someone else will want to extend an operation.

The third approach allows operations to be contributed for very specific actions, for example, Java™ Development Toolkit actions from Eclipse. Eclipse is an integrated development environment available from International Business Machines Corporation. Since these actions have knowledge and are well defined, the actions are able to be easily extended by other operations. However, the operations may only be applied after the specific actions and there is no control of the order in which the extending operations execute. Similar to the above approaches, the order of the actions is also one level deep and there is no way to execute an operation immediately prior to the specific action. Also, changes to the context of affected resources are not considered.

While the above approaches allow operations to be extended from a base operation, the level of extension is limited. In addition, there is no control of ordering in which the extending operations run. Moreover, pre and post operations are not commonly accepted by the base operation. Therefore, it would be advantageous to have a method for extending operations of an application, such that operations are automatically registered as extendable, pre and post operations may be defined, resources may be modified, ordering or priority of extending operations may be defined, the depth of extensions is not limited, and extended operation execution is dynamically determined based on function group enablement.

BRIEF SUMMARY OF THE INVENTION

The present invention provides a method, an apparatus, and computer instructions for extending operations of an application. Responsive to executing a primary operation, the mechanism of the present invention determines if a cycle is present in the execution path of the primary operation. If no cycle is present, the mechanism stores all extendable operation identifiers of the primary operation in a cache, and identifies a plurality of pre operation identifiers and post operation identifiers from the cached extendable operations.

For each pre operation identifier in the plurality of pre operation identifiers, the mechanism of the present invention creates a pre operation instance using the pre operation identifier, passes a data model of the primary operation to the pre operation instance, and runs the pre operation instance. The execution of the primary operation is then performed.

For each post operation identifier in the plurality of post operation identifiers, the mechanism of the present invention creates a post operation instance using the post operation identifier, passes a data model of the primary operation to the post operation instance, and runs the post operation instance.

Using the function group, enabling and priority may be determined for pre and post operations.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating an exemplary extension point definition in accordance with an illustrative embodiment of the present invention;

FIG. 6 is a diagram illustrating exemplary function group definitions and operation extension definitions in a markup language file in accordance with an illustrative embodiment of the present invention;

DETAILED DESCRIPTION OF THE INVENTION

Figure 1:
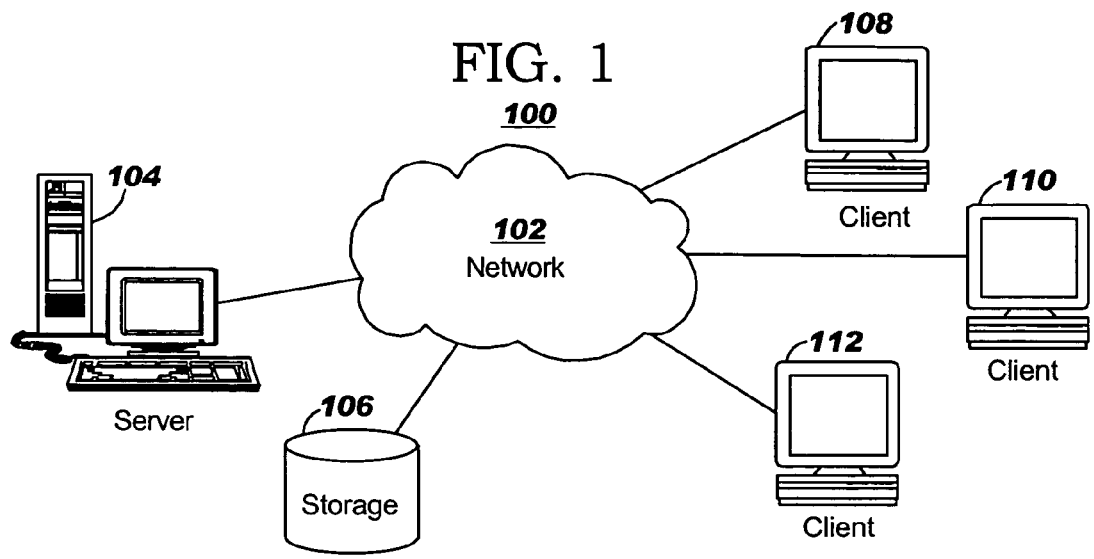
FIG. 1 is a pictorial representation of a network of data processing systems in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
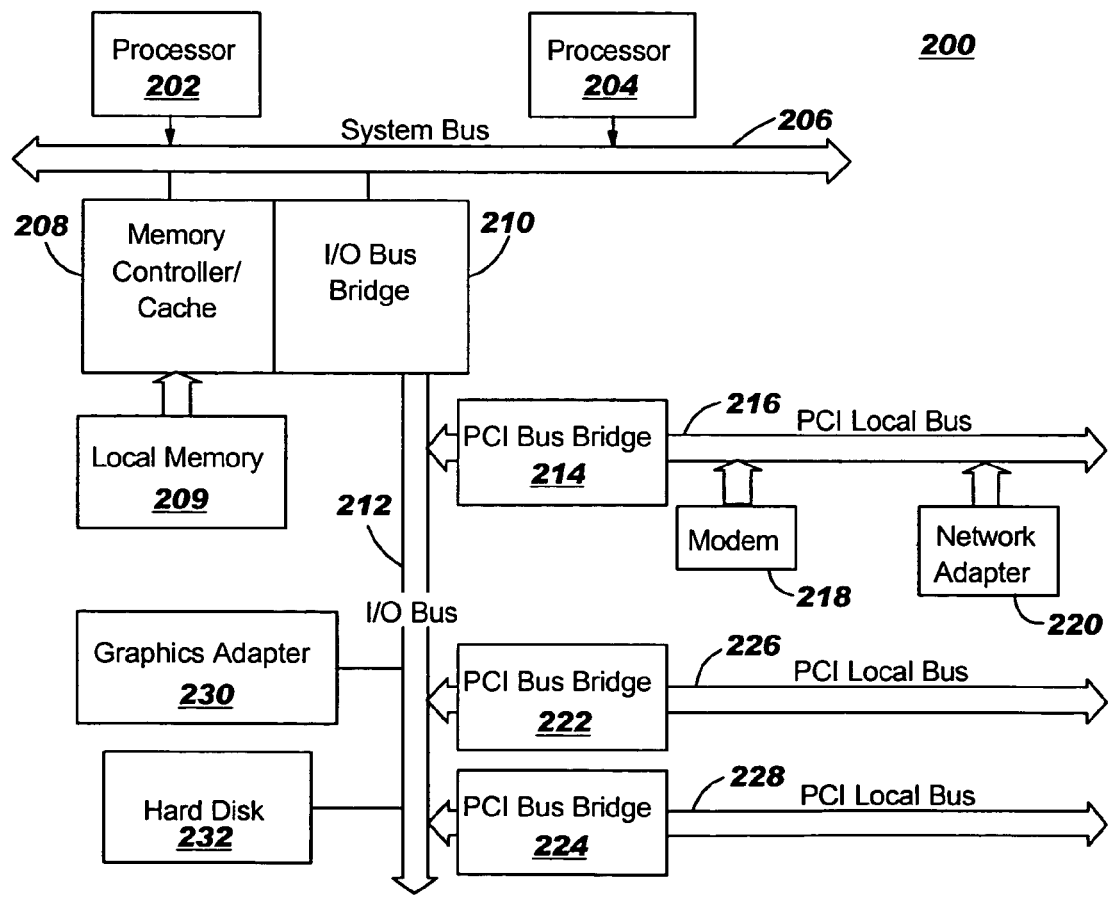
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

Figure 3:
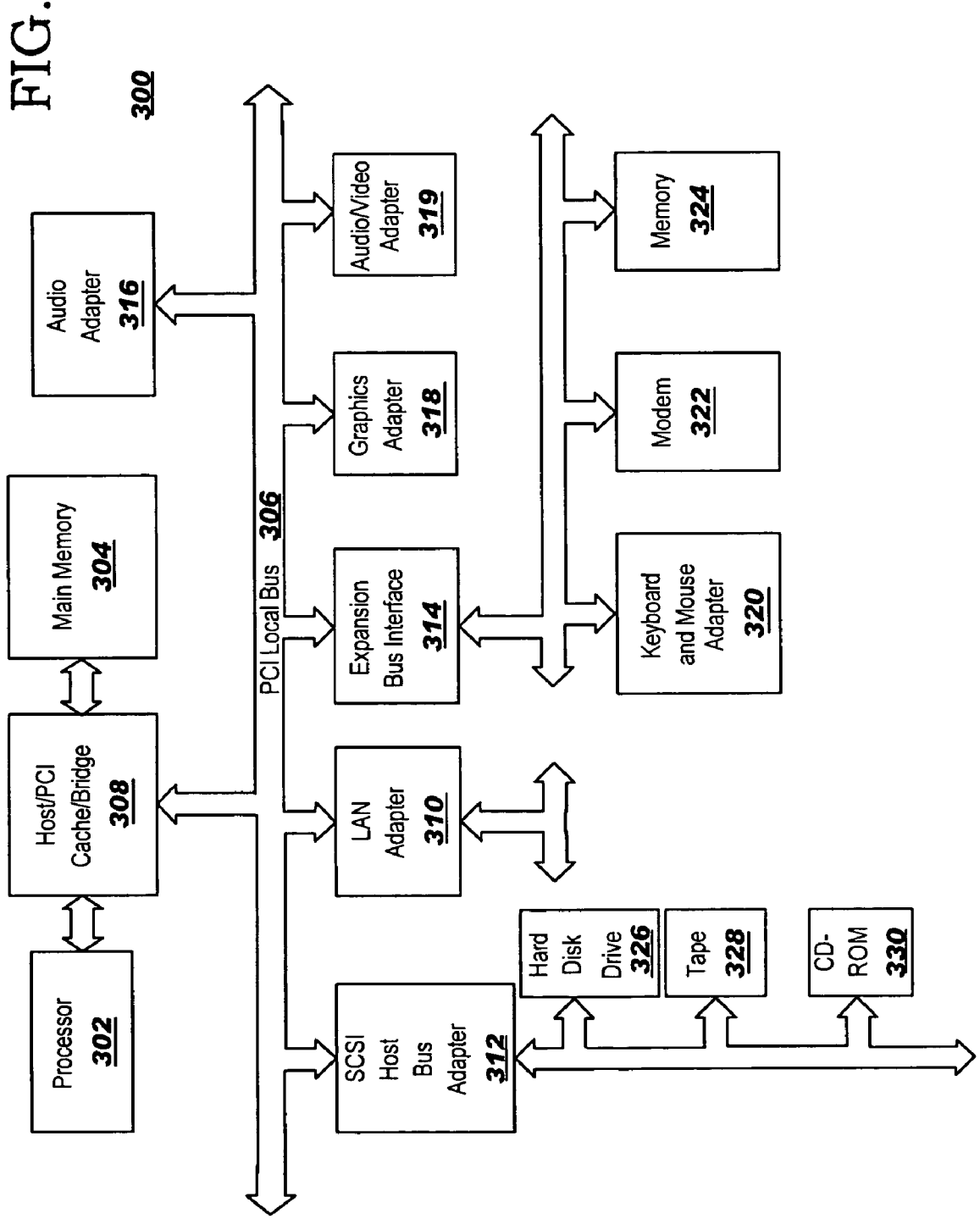
FIG. 3 is a block diagram illustrating a data processing system in accordance with an illustrative embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, an apparatus, and computer instructions for extending operations of an application in a data processing system. The processes and mechanisms of the present invention may be implemented in data processing system, such as data processing system 200 in FIG. 2 and data processing system 300 in FIG. 3. Examples of extending operations in applications may include extending workspace resources in an integrated development environment, or extending functionalities contributed by a third party vendor in a J2EE Application. J2EE is a product available from Sun Microsystems, Inc.

In an illustrative embodiment, the present invention allows any arbitrary operation to automatically register as an extendable operation or a base operation. An example of a base operation may be a rename operation. In the context of the present invention, the terms "base operation" and "primary operation" may be interchangeable. A user, such as a third party vendor, may define pre and/or post operations as extending operations that execute against the base operation. Since the pre and post operations are also extendable themselves, other operations may be extended against these pre and post operations. In this way, the level of extensions may be up to N-level deep and ordering of extending operations maybe defined.

In other words, by using the mechanism of the present invention, third party vendors may contribute new operations, such as editing, modifying, creating, or removing workspace resources and data, before or after a base operation. Thus, N-level deep extensibility and the capability to order extended operations can be achieved. In addition, the mechanism of the present invention provides a standard mechanism for creating and running extended operations as well as data management among both base and extended operations. The mechanism allows for data sharing and modification during operation execution.

The present invention leverages the capabilities of functions groups, which allow users to enable or disable an extended set of functionalities at runtime or tool time, to define and execute extended operations. As described in related patent application entitled "METHOD AND APPARATUS FOR IMPLEMENTING DYNAMIC FUNCTION GROUPS IN A DATA PROCESSING SYSTEM," incorporated by reference above, a mechanism is provided to detect a definition of a set of functionalities in a function group provided by a vendor to an extendable software application, and identifies an item contributed in the software application through an extension point.

Subsequently, the mechanism identifies other extension points corresponding to the item that includes a plurality of function groups and determines based on the definition of each function group within the plurality if a condition of the extendable software application is satisfied. If the condition is satisfied, the set of functionalities of the corresponding function group is enabled in the extendable software application. If the condition is not satisfied, the set of functionalities of the corresponding function group is disabled in the extendable software application. The present invention may utilize the extension points of the function groups to extend pre and post operations against an operation that is registered as an extendable or base operation. Thus, the present invention allows, in addition to the n-level extension of operations and ordering of operation extensions, the ability to selective execute all or a subset of operations and extensions based on context or workspace content.

Turning now to FIG. 4, a diagram illustrating an exemplary extension point definition is depicted in accordance with an illustrative embodiment of the present invention. As depicted in FIG. 4, a user may define an extension point using a markup language file, such as extensible markup language file 400. However, other types of definition formats may also be used to define an extension point without departing the scope and spirit of the present invention.

In extensible markup language file 400, an extending operation, operationExtension 401, is defined with functionGroupID 402 of "FunctionGroup1" 404. functionGroupID 402 identifies the name of the function group utilized to extend the primary or base operation. In this case, the name of the function group is "FunctionGroup1" 404. On the other hand, the primary operation being extended is identified by extendableOperationID 414. In this case, the operation identifier of the primary operation is "primary.op" 416.

In addition to functionGroupID 402 and extendableoperationID 414, the definition of operationExtension 401 includes preOperationId 406 and postOperationId 410. PreOperationId 406 identifies the identifier of a pre run operation that is executed prior to the primary operation. In this case, the pre run operation identifier is "fg1.pre.op" 408. PostOperationId 410 identifies the identifier of a post run operation that is executed after the primary operation. In this case, the post run operation identifier is "fg1.post.op" 412. It is noted that functionGroupID 402, preOperationId 406, postOperationId 410, and extendableOperationID 414 may all be specified using any form of identifier, including fully qualified name and unique key of a factory pattern.

Figure 5:
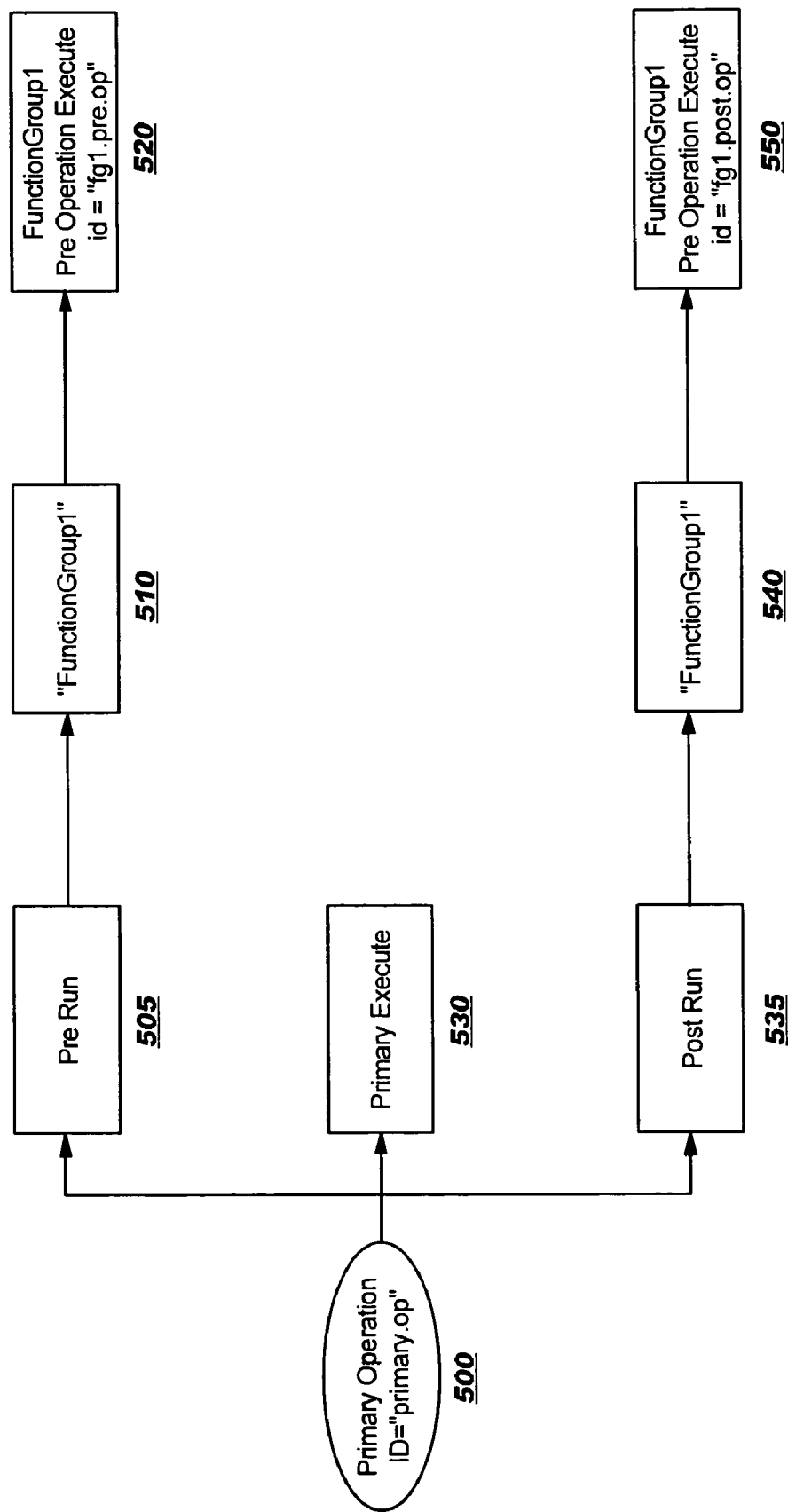
FIG. 5 is a diagram illustrating an exemplary operations framework based on the definition of operationExtension 401 in FIG. 4 in accordance with an illustrative embodiment of the present invention.

Turning now to FIG. 5, a diagram illustrating an exemplary operations framework based on the definition of operationExtension 401 in FIG. 4 is depicted in accordance with an illustrative embodiment of the present invention. As depicted in FIG. 5, in this illustrative example, operations framework includes primary operation 500, which is an operation that is registered as an extendable or a base operation. In this example, primary operation 500 represents extendableOperationID 414, which has an operation identifier of "primary.op".

Extending operations may be defined for primary operation 500, including pre run 505 and post run 535 operations. Pre run operation 505 and post run operation 535 are themselves by default extendable operations. In this example, "FunctionGroup1" 510, as defined by functionGroupID 402 in FIG. 4, may be utilized as an extension point to extend pre run operation 505. "FunctionGroup1" 510 extends pre run operation 505 to include Function Group 1 Pre Operation Execute operation 520, which has an operation identifier of "fg.pre.op" as defined by preOperationId 408 in FIG. 4.

Similar to pre run operation 505, "FunctionGroup1" 540 may be utilized as an extension point to extend post run operation 535. "FunctionGroup1" 540 extends post run operation 535 to include a Function Group 1 Post Operation Execute Operation 550, which has an operation identifier of "fg1.post.op" as defined by postOperationId 410 in FIG. 4. While, in this example, only one function group is utilized as an extension point, multiple function groups may be utilized to extend additional operations for pre run operation 505 and post run operation 535, with each function group having its own pre run operation, execute operation, and post run operation.

It is also possible to have only one pre or post operation identifier defined within an extension for a given function group. It is not required that both a pre and post operation identifier be defined. Even though it is not depicted in this diagram, it is possible to have more than one function group having a pre and post operation identifier for the same primary operation. It is also possible for a single function group to supply multiple pre and post operations. This could be done using multiple extensions. If multiple function groups contribute extended operations, the pre and or post operations are sorted based on the priority of the associated function groups, and executed in this sorted order.

In addition to pre run operation 505 and post run operation 535, primary operation 500 includes primary execute operation 530, which contains the actual logic that for the primary operation, for example, the logic of a renaming operation. Thus, a user may define an extension operation to extend a primary or base operation utilizing a function group by specifying a pre and post operation identifier.

Turning now to FIG. 6, a diagram illustrating exemplary function group definitions and operation extension definitions in a markup language file is depicted in accordance with an illustrative embodiment of the present invention. As shown in FIG. 6, in this illustrative example, function group definitions 600 includes definitions for function group "fg1" 602, "fg2" 604, and "fg3" 606.

Operation extensions 620 include definitions for extension point "OperationExtension" 622, which includes four operationExtensions, operationExtensions 624, 626, 628 and 630. OperationExtension 624 defines the identifier of the primary operation, "RenameOperationID" 644; the function group utilized to extend the primary operation, "fg1" 640; and a pre run operation identifier, "FixGroup1OperationClass" 642.

Similarly, operationExtension 626 defines that primary operation "FixGroup1OperationID" 650 is extended utilizing function group "fg3" 646 with a pre run operation identifier, "ReferenceHistoryOperationClass" 648. OperationExtension 628 is similar to operationExtension 626, which defines that primary operation "RenameOperationID" 658 is extended utilizing function group "fg2" 652 with a pre run operation identifier, "DeleteGroup2OperationClass" 654, except that operationExtension 628 also includes a post run operation with an identifier of "CreateGroup2ReferencesOperationClass" 656. In addition to operationExtension 626, operationExtension 630 also utilize function group "fg3" 660 to extend primary operation "DeleteGroup2OperationID" 664, with a pre run operation identifier of "ReferenceHistoryOperationClass" 662.

Figure 7:
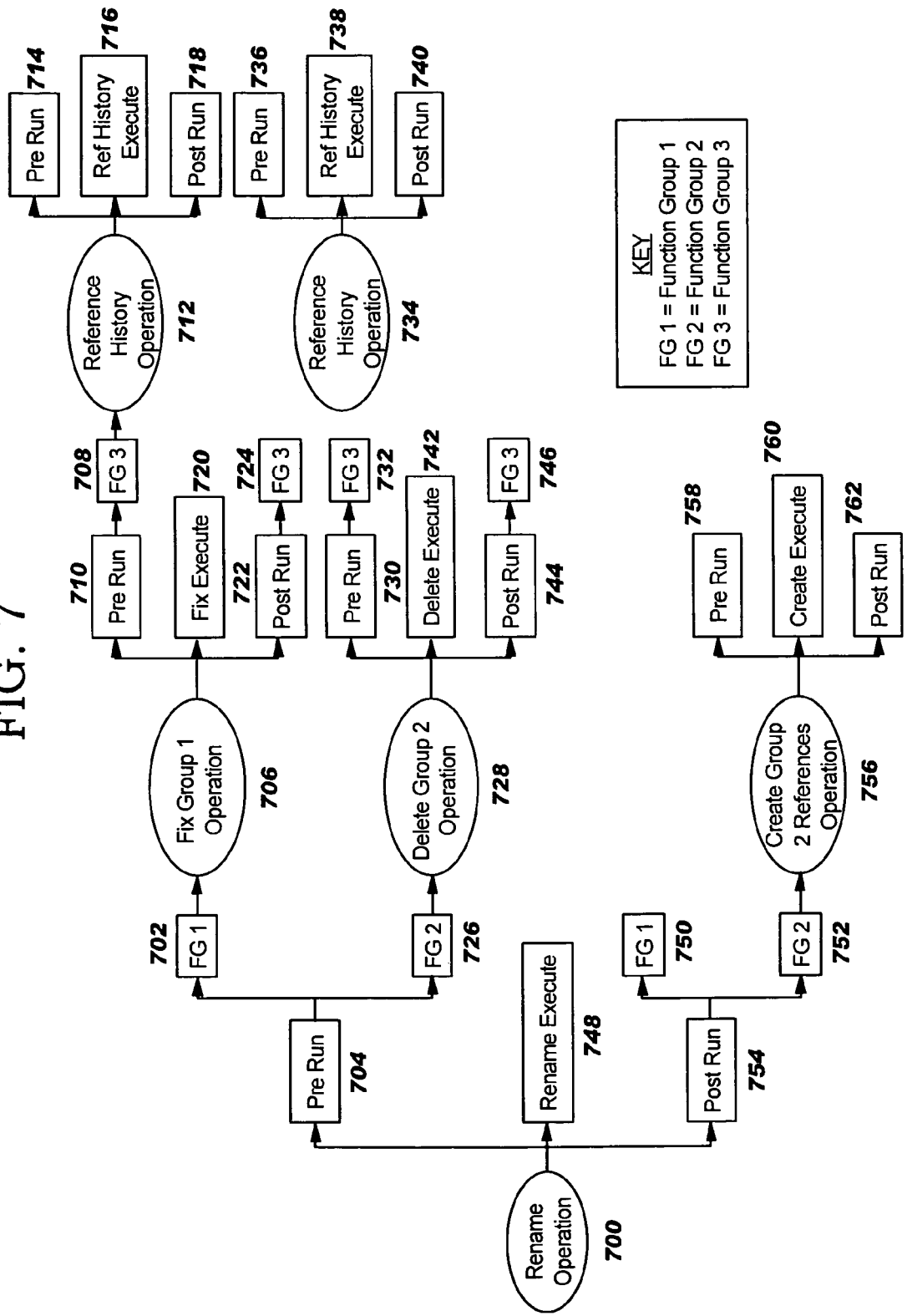
FIG. 7 is a diagram illustrating an example of possible operation extension definitions based on function group definitions and operation extension definitions in FIG. 6 in accordance with an illustrative embodiment of the present invention.

Turning now to FIG. 7, a diagram illustrating an example of possible operation extension definitions is depicted in accordance with an illustrative embodiment of the present invention. As shown in FIG. 7, rename operation 700 is a primary operation that may be common to a lot of applications.

In order to extend common rename operation 700, a third party vendor may define extensions using definitions such as extension point "OperationExtension" 622 in FIG. 6. According to operationExtension definition 624 in FIG. 6, function group "FG1" 702 is utilized to extend rename operation 700 as a pre operation 704. "FG1" 702 may include a group of operations available from a particular vendor. "FG1" 702 defines pre operation "FixGroup1Operation" 706, which is itself an extendable operation as defined by operationExtension definition 626 in FIG. 6.

According to operationExtension definition 626 in FIG. 6, function group "FG3" 708 is utilized to extend "FixGroup1Operation" 706 as pre run operation 710. "FG3" 708, as defined by functionGroupID 646 in FIG. 6, defines pre operation "ReferenceHistoryoperation" 712, as defined by preoperationid 648 in FIG. 6. In turn, "ReferenceHistoryOperation" 712 may be a base operation with extended pre operation 714, "ReferenceHistoryExecute" 716, and post operation 718. If "FG3" 708 is enabled, after "ReferenceHistoryoperation" 712 is executed, Fix Group 1 operation 720 is executed as depicted in "Fix Execute" 720. Then, all post operations are run 722, which also utilizes function group "FG3" 724.

In addition to "FG1" 702, "FG2" 726 extends rename operation 700 as a pre operation 704. Similar to "FG1" 702, "FG2" 726 executes pre operation "DeleteGroup2Operation" 728 for rename operation 700 according to operationExtension 628 in FIG. 6. "DeleteGroup2Operation" 728 is itself an extendable operation, as defined by operationExtension definition 630 in FIG. 6.

Similar to "FG3" 708, function group "FG3" 732 executes pre operation 730 "ReferenceHistoryOperation" 734, as defined by preOperationId 662 in FIG. 6. In turn, "ReferenceHistoryOperation" 734 may be a base operation where it first runs pre operations 736, executes the reference history operation 738, and then runs post operations 740. After all pre operations are run 730, "Delete Group 2 Operation" is executed 742 followed by the running of all post operations 744, which also utilizes function group "FG3" 746 in this example.

It is noted that since function groups are enabled or disabled based on user definitions, either "FG1" or "FG2" may be enabled at a given time, both "FG1" and "FG2" may be enabled at the same time, or neither "FG1" nor "FG2" may be enabled. Since function groups may also be associated with a priority, if "FG1" and "FG2" define priorities, their operations will be ordered as such. The priority of function groups may be predefined. Thus, if "FG1" has a higher priority than "FG2", "FG1" is enabled before "FG2" is enabled.

Once pre operations 704 are run, "Rename Operation" is executed 748. "RenameExecute" 748 is similar to primary execute 530 in FIG. 5, which contains the actual logic that performs the renaming for Renaming Operation 700. Subsequently, function group "FG1" 750 does not define a post operation but "FG2" 752 has an extension to rename operation 700 as post operation 754. As defined by operationExtension 628 in FIG. 6, "CreateGroup2ReferencesOperation" 756 is associated with function group "FG2" 752 as a post operation 754 for rename operation 700. In turn, "CreateGroup2ReferencesOperation" 756 is a base operation which when run will first run all extended pre operations 758, execute it logic 760, and finally run all post operations 762.

As shown in the examples given in FIG. 7, the present invention leverages the capabilities of dynamically enabling and disabling function groups to extend pre and post operations for any arbitrary primary or base operation. In this way, secondary operations may be added to the primary operation without the knowledge of the primary operation, while primary operations may be extended to include secondary operations without knowledge of the secondary operations. In addition, operations may be ordered based on how primary operations are extended.

Figure 8:
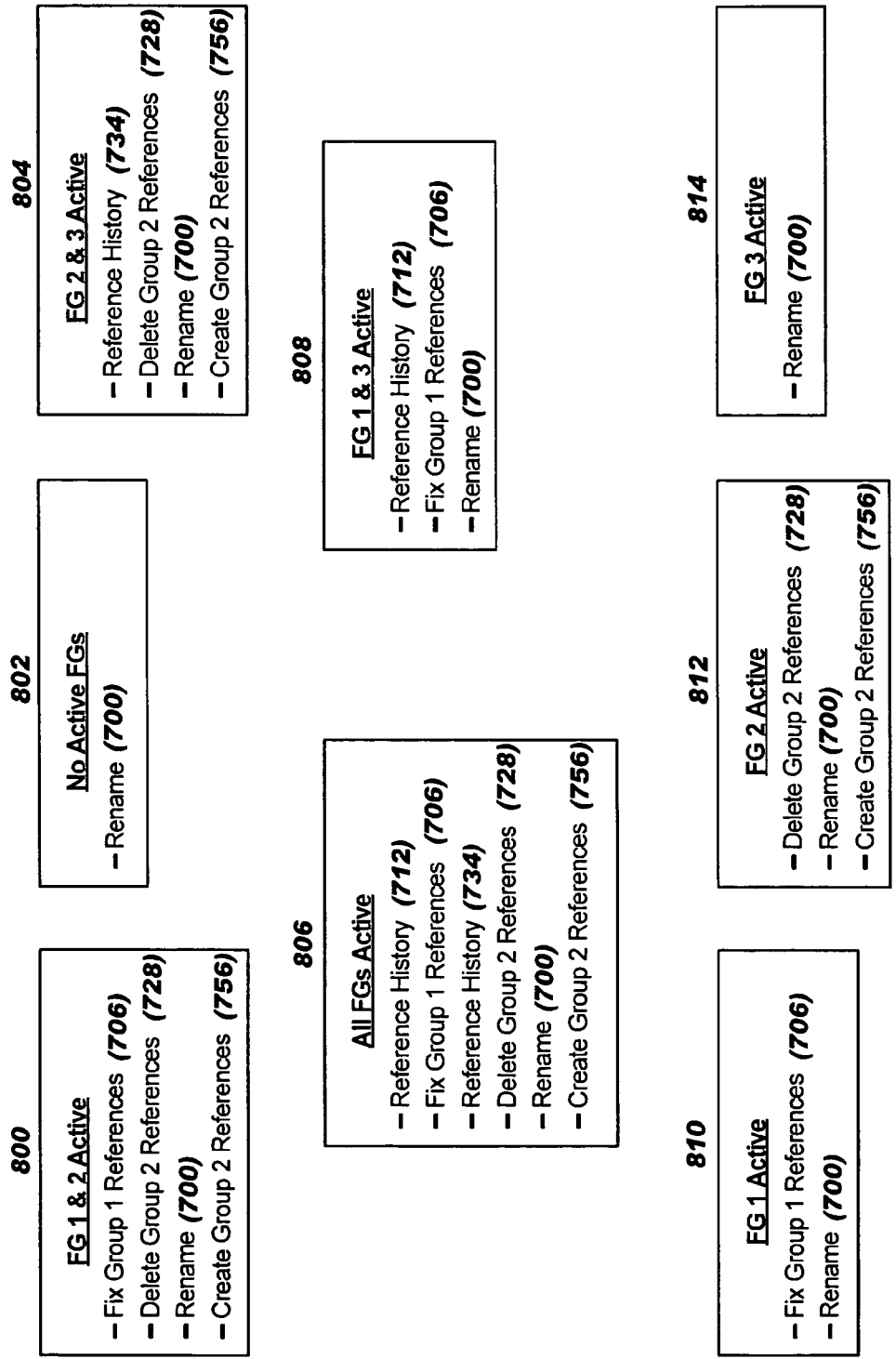
FIG. 8 is a diagram illustrating exemplary scenarios of enabling and disabling function groups in the operations framework and the resulting execution order for the example in FIG. 7 in accordance with an illustrative embodiment of the present invention.

Turning now to FIG. 8, a diagram illustrating exemplary scenarios of enabling and disabling function groups in the operations framework and the resulting execution order for the example in FIG. 7 is depicted in accordance with an illustrative embodiment of the present invention. This figure illustrates execution paths of operations based on how function groups from FIG. 7 are enabled. As shown in FIG. 8, in example scenario 800, since "FG1" 701, "FG2" 726, 752 (same function group) are enabled, "FixGroup1Operation" 706 in FIG. 7 associated with "FG1" 702 is executed, followed by "DeleteGroup2Operation" 728 in FIG. 7, which is associated with "FG2" 726. In turn, primary operation, rename operation 700 in FIG. 7, is executed, followed by "CreateGroup2ReferencesOperation" 756 in FIG. 7, which is associated with "FG2" 752.

In example scenario 802, no function groups are enabled (active). Therefore, only primary operation, rename operation 700 in FIG. 7, is executed. In example scenario 804, since "FG2" 726, 752 and "FG"3 732 are enabled, "ReferenceHistoryOperation" 734, associated with "FG3" 732, is executed first, followed by "DeleteGroup2Operation" 728, which is associated with "FG2" 726. Next, rename operation 700 is executed, followed by "CreateGroup2References" 756, which is associated with "FG2" 752.

In example scenario 806, since all function groups are active, "FG1" 702, "FG2" 726, 752, "FG3" 708, 732 are all enabled. Thus, "ReferenceHistoryOperation" 712, associated with "FG3" 708, is executed, followed by "FixGroup1Operation" 706 associated with "FG1" 702, and followed by "DeleteGroup2Operation" 728 associated with "FG2" 726. Finally, after primary operation, rename operation 700, is executed, it is followed by "CreateGroup2ReferencesOperation" 756 associated with "FG2" 752.

In example scenario 808, only "FG1" 702 and "FG3" 708 are active. Therefore, "ReferenceHistoryOperation" 712, associated with "FG3" 708, is executed, followed by "FixGroup1References" associated with "FG1" 702, before rename operation 700 is executed. In example scenario 810, only "FG1" 702 is active. Thus, only "FixGroup1Operation" 708, associated with "FG1" 702, is executed, followed by rename operation 700. Since no post operation is associated with "FG1" 750, no post operations are run.

In example scenario 812, "FG2" 726, 752 are active. Thus, "DeleteGroup2References" 728, associated with "FG2" 726, is executed, followed by rename operation 700, and "CreateGroup2References" 756 associated with "FG2" 752. In example scenario 814, since only "FG3" is active and the pre operation associated with "FG3" only extends operations that are associated with "FG1" and "FG2", only rename operation 700 is executed.

Figure 9:
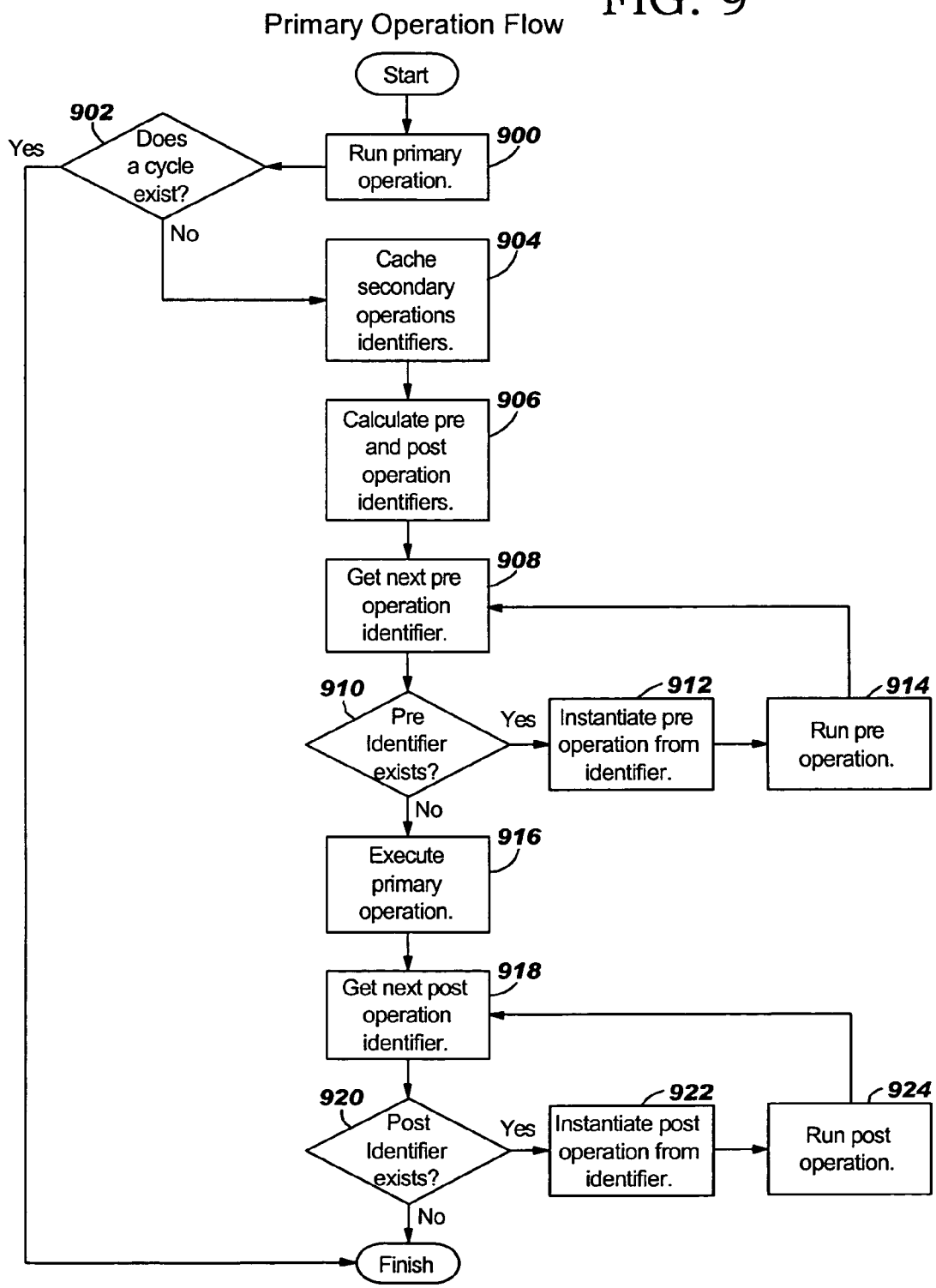
FIG. 9 is a flowchart of an exemplary process of extending operations in an application in accordance with an illustrative embodiment of the present invention.

Turning now to FIG. 9, a flowchart of an exemplary process of extending operations in an application is depicted in accordance with an illustrative embodiment of the present invention. As shown in FIG. 9, the process begins when a primary operation, for example, a rename operation, is invoked in an application (step 900). Upon detecting a primary operation invocation, the mechanism of the present invention makes a determination as to whether a cycle in the execution path of the primary operation exists (step 902). A cycle may exist if a primary operation is also a secondary operation of another operation, which happens to be a secondary operation of a primary operation. If a cycle exists, the process terminates thereafter.

However, if no cycle exists, all extended operation identifiers are cached (step 904). This caching step only happens once within the running application. The mechanism of the present invention basically reads all the extensions with pre and post operation identifiers and creates a cache structure to be used for the rest of the process. This step is discussed in further detail in FIG. 10. Once all the extended operation identifiers are cached, the mechanism of the present invention calculates the pre and post operation identifiers and temporarily caches these identifiers (step 906). This step is discussed in further detail in FIG. 11.

Once the pre identifiers and post identifiers are calculated, the mechanism of the present invention starts iterating over the pre operation identifiers and retrieves the next pre operation identifier from the cache (step 908). The mechanism of the present invention determines whether a pre operation identifier exists (step 910). If the pre operation identifier exists, the mechanism of the present invention creates a new instance of the pre operation using the identifier (step 912). The identifier may be a fully qualified name of a pre operation class, which may be instantiated using reflection, or a unique key which a factory knows how to instantiate an operation based on the key.

It is noted that when the pre operation is instantiated, the data model object of the primary operation is passed to the pre operation, such that the pre operation may obtain all of the available information from the primary operation. The pre operation may change properties of the model if it so desires.

After the pre operation is instantiated, the mechanism of the present invention runs the instantiated pre operation (step 914). The pre operation has now become a primary operation in step 900. At this time, if a failure is encountered when running the pre operation instance, corresponding post operations are ignored, since pre and post operations work hand in hand. However, if the pre operation is successful, the process then returns to step 908 to retrieve the next identifier and repeats steps 910-914 until all pre operations are run. Then, the mechanism of the present invention executes the primary operation (step 916), which contains the actual logic of the operation. After the primary operation is executed, the mechanism of the present invention retrieves the next post operation identifier from the temporary cache in step 906 (step 918).

A determination is then made by the mechanism as to whether a post operation identifier exists (step 920). If no post operation identifier exists, the process terminates thereafter. However, if a post operation identifier exists, the mechanism of the present invention creates a new instance of the post operation using the identifier (step 922). Similar to the pre operation identifier, the post operation identifier may be a fully qualified name of the pre operation class or a unique key within a factory pattern. Also, the model object of the primary operation is also passed to the post operation, such that the post operation has information available from the primary operation and may modify properties of the primary operation if it so desires.

After the post operation is instantiated, the mechanism of the present invention runs the instantiated post operation (step 924) and the post operation has now become the primary operation in step 900. The process then returns to step 918 to retrieve the next identifier and repeats steps 920-924 until all post operations are run. Thus, the process terminates thereafter.

Figure 10:
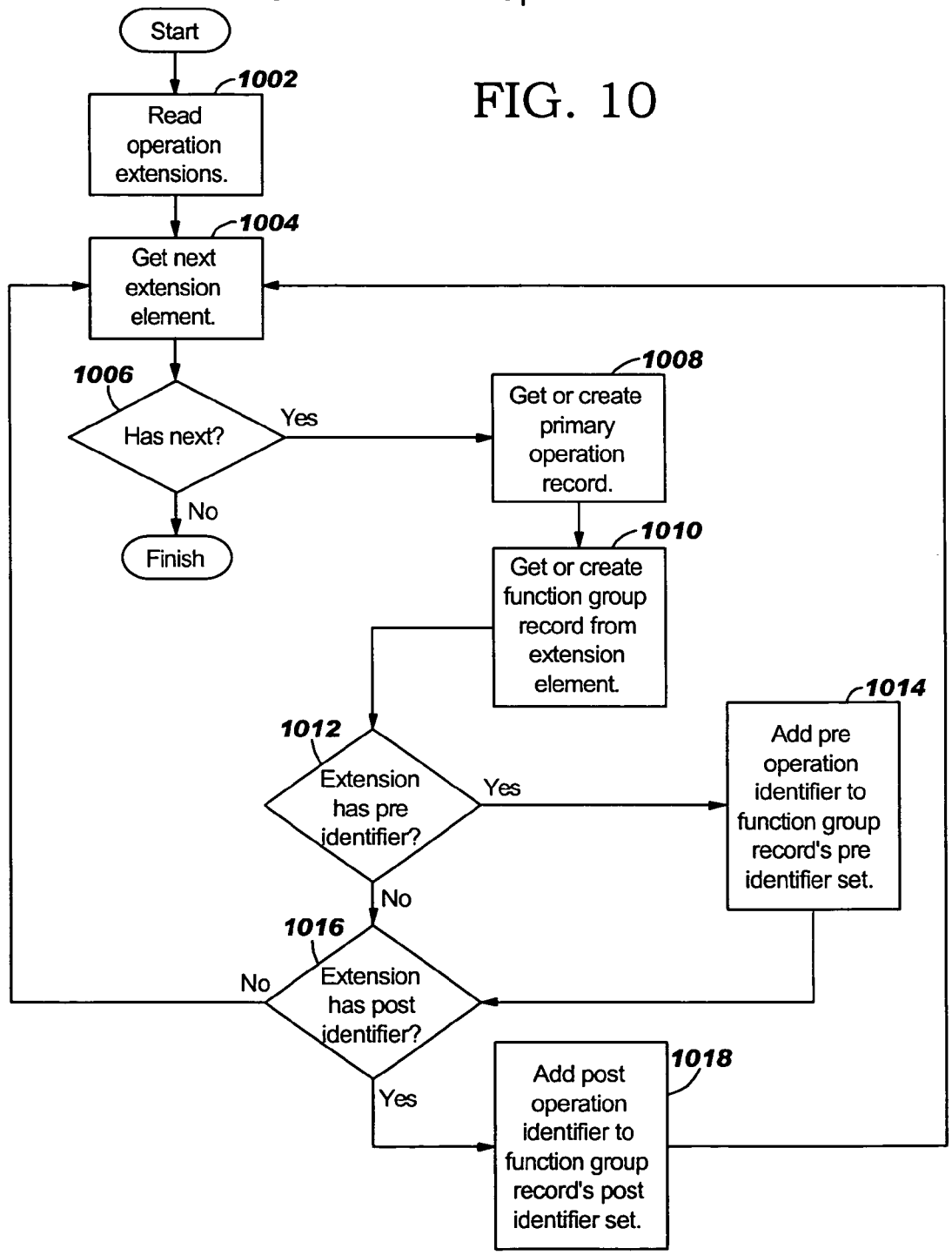
FIG. 10 is a flowchart of an exemplary process for caching extended operation identifiers in accordance with an illustrative embodiment of the present invention.

Turning now to FIG. 10, a flowchart of an exemplary process for caching extended operation identifiers is depicted in accordance with an illustrative embodiment of the present invention. This process describes step 904 in FIG. 9 in further detail. As shown in FIG. 10, the process begins when the mechanism of the present invention first reads all of the operation extensions (step 1002). These extensions are similar to operation extensions 401 in FIG. 4, which are mechanisms for defining pre and post operations for a given primary operation and assigning pre and post operation identifiers to a function group. These extensions may be defined in a markup language file, such as XML file.

Next, the mechanism of the present invention retrieves the next extension element (step 1004) and determines if a next extension element is present (step 1006). If no next extension element is present, the process terminates thereafter. However, if the next extension element is present, the mechanism of the present invention obtains the primary operation record from the cache (step 1008), such as ExtendedOperationCache. ExtendedOperationCache stores all extended operation identifiers that are keyed off of the primary operation identifier which each extended operation extends. If no primary operation record exists in the cache, the mechanism creates a new primary operation record, sets the operation identifier from within the extension element, and places it in the ExtendedOperationCache.

Once the primary operation record is obtained, the mechanism of the present invention gets or creates a function group record with a name corresponding to the function group identifier of the extension element (step 1010). If a function group record is created, the mechanism then associates the function group record with the primary operation record. A primary operation record has a collection of function group records.

Once the function group record is obtained, the mechanism of the present invention makes a determination as to whether a pre operation identifier is present in the extension element (step 1012). If a pre operation identifier is present, the mechanism adds the pre operation identifier to the function group record's set of pre operation identifiers (step 1014) and continues to step 1016. If no pre operation identifier is present, the mechanism makes a determination as to whether a post operation identifier is present in the extension element (step 1016). If the post operation is not present, the process returns to 1004 to retrieve the next extension element. If the post operation is present, the mechanism adds the post operation identifier to the function group record's set of post operation identifiers (step 1018) and the process returns to 1004. More details regarding the operation extension cache structure are discussed in FIG. 12.

Figure 11:
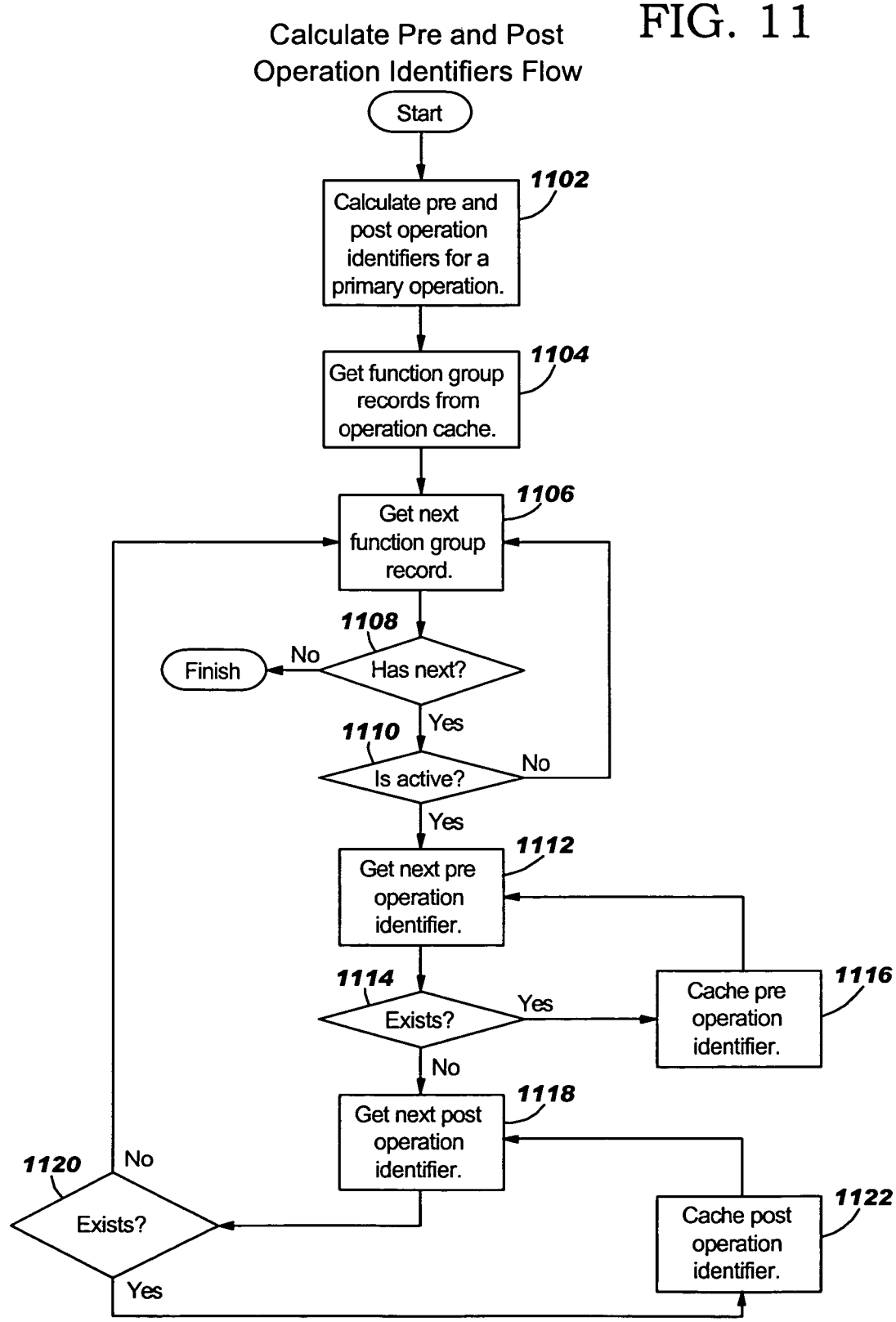
FIG. 11 is a flowchart of an exemplary process for calculating pre and post operation identifiers for a given primary operation in accordance with an illustrative embodiment of the present invention.

Turning now to FIG. 11, a flowchart of an exemplary process for calculating pre and post operation identifiers for a given primary operation is depicted in accordance with an illustrative embodiment of the present invention. This process describes step 906 in FIG. 9 in further detail. As shown in FIG. 11, the process begins when the primary operation is invoked to calculate pre and post operation identifiers (step 1102).

Given the unique identifier of the primary operation, the mechanism of the present invention obtains the set of functions group records from the extended operation cache and sorts them by function group priority (step 1104). The set of function groups for the given primary operation is generated using the process as described in FIG. 10. The mechanism then iterates over the set of priority ordered function group records and obtains the next record (step 1106).

The mechanism makes a determination as to whether the next function group record is present (step 1108). If no next function group record is present, the process terminates thereafter. If the next function group record is present, the mechanism makes a determination as to whether the function group corresponding to the function group record is active (step 1110). According to the related patent application entitled "METHOD AND APPARATUS FOR IMPLEMENTING DYNAMIC FUNCTION GROUPS IN A DATA PROCESSING SYSTEM," this decision is based on whether a condition of the extendable software application is satisfied. Examples of the condition include current environment settings, specific project characteristics, etc.

If the function group corresponding to the function group record is not active the process returns to 1006, otherwise, the mechanism of the present invention retrieves the next pre operation identifier from the function group record's set of pre operation identifiers (step 1112) and determines whether the next pre operation identifier exists in the function group record (step 1114). If the next pre operation identifier exists in the function group record, the mechanism adds the pre operation identifier to the local cache (step 1116) that must be run for the given primary operation and the process continues to step 1112.

However, if the next pre operation identifier does not exist in the function group record, the mechanism retrieves the next post operation identifier from the function group record's set of post operation identifiers (step 1118). The mechanism then determines if the next post operation identifier exists in the function group record (step 1120). If no next post operation identifier exists in the function group record, the process returns to step 1106 to retrieve the next function group record from the set of records in the extended operation cache. If the next post operation identifier exists in the function group record, the mechanism adds the post operation identifier to the local cache (step 1122) that must be run for the given primary operation and the process returns to step 1118 to retrieve the next post operation identifier from the function group record's set of post operation identifiers.

Figure 12:
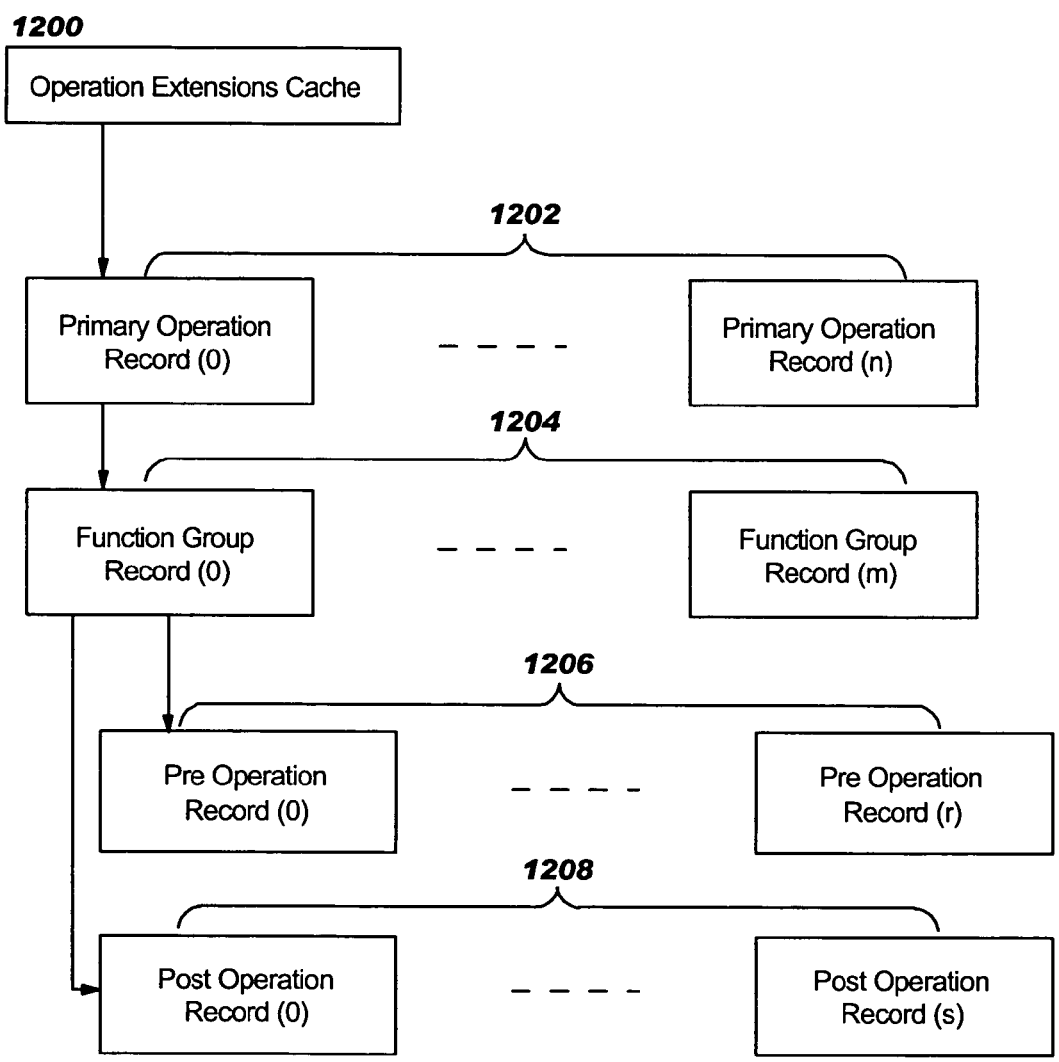
FIG. 12 is a diagram illustrating an exemplary operation extensions cache structure in accordance with an illustrative embodiment of the present invention.

Turning now to FIG. 12, a diagram illustrating an exemplary operation extensions cache structure is depicted in accordance with an illustrative embodiment of the present invention. As shown in FIG. 12, operation extension cache 1200 includes a set of primary operation records 1202, from primary operation record (0) to primary operation record (n)

Each primary operation record also includes a set of function group records 1204, from function group record (0) to function group record (m). Each function group record has a name that corresponds to a function group identifier of the extension element. Each function group record in turn has its own set of pre operation identifiers 1206, from pre operation identifier (0) to pre operation identifier (r), and post operation identifiers 1208, from post operation identifier (0) to post operation identifier (s). Thus the pre and post identifiers are now associated with function groups and primary operations in a cache for quick retrieval.

In summary, the present invention provides a mechanism for extending operations of an application in a data processing system by leveraging the capabilities of function groups to dynamically enable or disable extendable operations which are associated with a function group. By using the mechanism of the present invention, ordering of operations may be achieved. In addition, a third party vendor may add operations to any arbitrary base operation without the limitations of extension depth.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for extending operations of an application, the method comprising:
    responsive to running a primary operation, identifying all pre and post operations based on predefined metadata and an environment context of the application, wherein identifying comprises:
        responsive to running the primary operation, determining if a cycle is present in an execution path of the primary operation;
        if no cycle is present, populating an extended operation cache with cached extended operation identifiers, wherein populating comprises:
            reading a plurality of operation extensions for a given primary operation identifier;
            determining if each corresponding operation extension in the plurality of operation extensions defines a corresponding at least one of a pre or post operation identifier;
            associating the corresponding at least one of pre or post operation identifier with a corresponding function group identifier;
            for each corresponding operation extension in the plurality of operation extensions, creating a corresponding primary operation record for each operation extension, and
            placing the corresponding primary operation record in the extended operation cache; and wherein identifying further comprises:
        identifying a plurality of pre operation identifiers and post operation identifiers from the cached extended operation identifiers; and wherein the method further comprises:
    recursively running all pre operations in a predefined order;
    executing the primary operation; and
    recursively running all post operations in a predefined order.

2. The method of claim 1, wherein recursively running all pre operations in a predefined order comprises:
    for each corresponding pre operation identifier in the plurality of pre operation identifiers, creating a corresponding pre operation instance using the corresponding pre operation identifier,
    passing a data model of the primary operation to the corresponding pre operation instance, and running the corresponding pre operation instance.

3. The method of claim 2, wherein recursively running all post operations in a predefined order comprises:
    for each corresponding post operation identifier in the plurality of post operation identifiers:
    creating a corresponding post operation instance using the corresponding post operation identifier,
    passing a data model of the primary operation to the corresponding post operation instance, and running the corresponding post operation instance.

4. The method of claim 1, wherein the populating step further comprises:
    for each corresponding operation extension in the plurality of operation extensions, locating a corresponding function group record for the corresponding operation extension, wherein the corresponding function group record defines a corresponding function group;
    if no function group record is present for the corresponding operation extension, creating a corresponding function group record for each corresponding operation extension;
    adding the corresponding function group record to a plurality of function group records for the primary operation; and
    determining if a corresponding pre operation identifier is present in the corresponding operation extension.

5. The method of claim 4, wherein populating an extended operation cache further comprises:
    if the corresponding pre operation identifier is present, adding the corresponding pre operation identifier to the corresponding function group record; and
    determining if a corresponding post identifier is present in the corresponding operation extension;
    if the corresponding post operation identifier is present, adding the corresponding post operation identifier to the corresponding function group record.

6. The method of claim 1, wherein each of the plurality of pre operation identifiers and post operation identifiers are defined by one of a corresponding fully qualified name and a corresponding unique key within a factory pattern.

7. The method of claim 1, wherein extended operations identified by the cached extended operation identifiers are themselves primary operations.

8. The method of claim 4, further comprising:
    if no corresponding function group corresponding to the corresponding function group record is active, executing only the primary operation.

9. The method of claim 1, wherein the plurality of operation extensions are defined in an extensible markup language file.

10. The method of claim 4, wherein one or more function groups of the plurality of function groups may be active at a given time and one or more function groups of the plurality of function groups may be ordered based on a predefined priority.

11. The method of claim 2, wherein the corresponding pre operation instance modifies properties of the data model if the corresponding pre operation instance so desires and wherein a corresponding post operation instance modifies properties of the data model if the corresponding post operation so desires.

12. The method of claim 3, further comprising:
responsive to detecting a failure of the corresponding pre operation instance, ignoring post operations corresponding to the corresponding pre operation instance.

13. The method of claim 1, wherein extended operations identified by the extended operation identifiers are defined to any depth and wherein the extended operations have no knowledge of operations from which the extended operations are extended.

14. The method of claim 12, wherein the extended operations are automatically extendable once the extended operations are defined.

* * * * *